US012627864B2

(12) United States Patent
Oh

(10) Patent No.: US 12,627,864 B2
(45) Date of Patent: May 12, 2026

(54) DISPLAY DEVICE

(71) Applicant: LG ELECTRONICS INC., Seoul (KR)

(72) Inventor: Seungkeun Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/854,692

(22) PCT Filed: Apr. 7, 2022

(86) PCT No.: PCT/KR2022/005004
§ 371 (c)(1),
(2) Date: Oct. 7, 2024

(87) PCT Pub. No.: WO2023/195556
PCT Pub. Date: Oct. 12, 2023

(65) Prior Publication Data
US 2025/0227342 A1 Jul. 10, 2025

(51) Int. Cl.
*H04N 21/485* (2011.01)
*H04N 21/422* (2011.01)
(52) U.S. Cl.
CPC ... *H04N 21/4858* (2013.01); *H04N 21/42208* (2013.01); *H04N 21/4221* (2013.01)

(58) Field of Classification Search
None
See application file for complete search history.

(56) References Cited

U.S. PATENT DOCUMENTS

2016/0227151 A1* 8/2016 Phang .............. H04N 21/42204
2018/0063474 A1* 3/2018 Fukuda ................ H04N 21/431

FOREIGN PATENT DOCUMENTS

| JP | 2007-60555 A | 3/2007 |
|---|---|---|
| JP | 2012-155675 A | 8/2012 |
| JP | 2014-506365 A | 3/2014 |
| JP | 2018-25916 A | 2/2018 |
| KR | 10-2021-0045342 A | 4/2021 |
| KR | 10-2021-0082758 A | 7/2021 |

* cited by examiner

*Primary Examiner* — Samira Monshi
(74) *Attorney, Agent, or Firm* — Birch, Stewart, Kolasch & Birch, LLP

(57) ABSTRACT

This display device according to an embodiment of the present invention may comprise: a display on which a plurality of images are displayed in a plurality of regions; and a controller which receives a selection command for selecting one image from among the plurality of images, obtains a manipulation user interface (UI) for manipulating an image selected according to the received selection command, changes an attribute of the obtained manipulation UI, and displays the manipulation UI with the changed attributes on the display.

13 Claims, 13 Drawing Sheets

S501 — DISPLAY PLURALITY OF IMAGES

S503 — IS WHICH IMAGE AMONG PLURALITY OF IMAGES SELECTED?    NO

YES

S505 — ACQUIRE MANIPULATION UI CORRESPONDING TO SELECTED IMAGE

S507 — CHANGE ATTRIBUTES OF ACQUIRED MANIPULATION UI AND OUTPUT ATTRIBUTES

FIG. 8

DISPLAY DEVICE

CROSS REFERENCE TO RELATED APPLICATIONS

This application is the National Phase of PCT International Application No. PCT/KR2022/005004, filed on Apr. 7, 2022, which is hereby expressly incorporated by reference into the present application.

TECHNICAL FIELD

The present disclosure relates to a display device.

BACKGROUND ART

Digital TV services using wired or wireless communication networks are becoming widespread. Digital TV services may provide a variety of services that may not be provided by existing analog broadcasting services.

For example, Internet Protocol Television (IPTV), a type of digital TV service, and smart TV service provide interactivity that allows users to actively select the type of program to watch, the viewing time, or the like. Based on this interactivity, IPTV and smart TV services may also provide various additional services, such as Internet search, home shopping, and online games.

The manipulation commands for manipulating the playback of the image are displayed within the region where the image is displayed.

In display devices that support the multi-view function, the number of images increases and the size of one image may decrease. Accordingly, the region that displays the image manipulation commands decreases, causing inconvenience in manipulation.

DISCLOSURE

Technical Problem

An object of the present disclosure is to provide a display device capable of conveniently manipulating a selected image during operation of a multi-view function in a display device capable of outputting a plurality of images.

An object of the present disclosure is to provide a display device capable of changing the attributes of a user interface for manipulating a selected image during operation of a multi-view function in a display device capable of outputting a plurality of images.

Technical Solution

A display device according to an embodiment of the present disclosure may include a display for displaying a plurality of images in each of a plurality of regions; and a controller for receiving a selection command for selecting one of the plurality of images, acquiring a manipulation user interface (UI) for manipulating the selected image according to the received selection command, changing attributes of the acquired manipulation UI, and displaying the manipulation UI with the changed attributes on the display.

Advantageous Effect

According to various embodiments of the present disclosure, when an image to be manipulated is selected from among a plurality of images, the inconvenience of image manipulation may be resolved by outputting UIs that appear in the entire display region rather than the region of the selected image.

According to an embodiment of the present disclosure, the convenience of a user's manipulation of an image may be greatly improved by changing the attributes of a user interface for manipulating an image selected during operation of a multi-view function in a display device capable of outputting a plurality of images.

DESCRIPTION OF DRAWINGS

FIGS. 7 to 10 are views illustrating examples in which attributes of a manipulation UI are changed according to an embodiment of the present disclosure.

BEST MODE

Hereinafter, embodiments relating to the present disclosure will be described in detail with reference to the accompanying drawings. The suffixes "interface", "module" and "unit" for components used in the description below are assigned or mixed in consideration of easiness in writing the specification and do not have distinctive meanings or roles by themselves.

A display device according to an embodiment of the present disclosure, for example, as an artificial display device that adds a computer supporting function to a broadcast receiving function, may have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS may be used.

Accordingly, since various applications are freely added or deleted on a general purpose OS kernel, a display device described herein, for example, may perform various user-friendly functions. The display device, in more detail, may be a network TV, Hybrid Broadcast Broadband TV (HBBTV), smart TV, light-emitting diode (LED) TV, organic light-emitting diode (OLED) TV, and so on and in some cases, may be applied to a smartphone.

Figure 1:
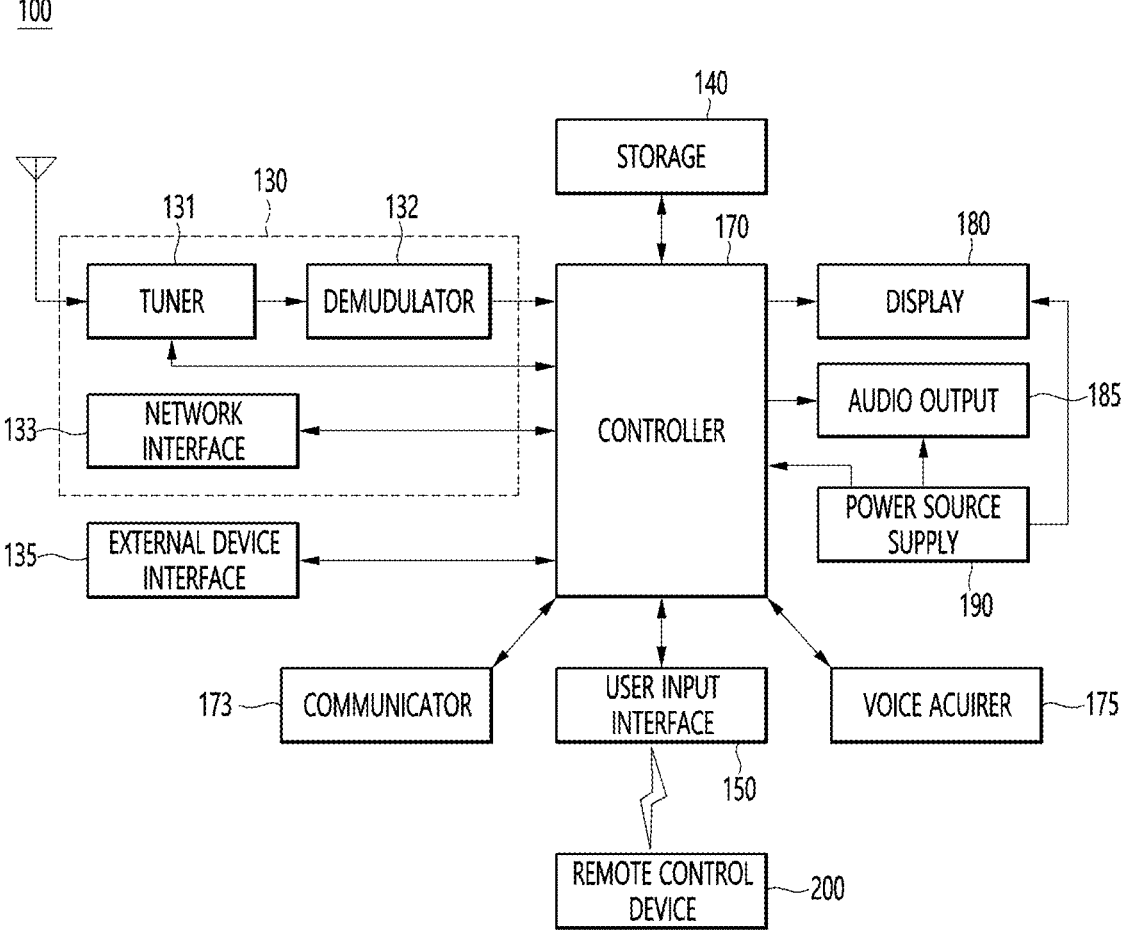
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast reception module 130, an external device interface 135, a memory 140, a user input interface 150, a controller 170, a wireless communication interface 173, a display 180, an speaker 185, and a power supply circuit 190.

The broadcast reception module 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulator 132 may divide the received broadcast signals into video signals, audio signals, and broadcast program-related data signals, and may restore the divided video signals, audio signals, and data signals into an output available form.

The external device interface 135 may receive an application or an application list in an adjacent external device and deliver the application or the application list to the controller 170 or the memory 140.

The external device interface 135 may provide a connection path between the display device 100 and an external device. The external device interface 135 may receive at least one of an image or audio outputted from an external device that is wirelessly or wiredly connected to the display device 100 and deliver the received image or the audio to the controller. The external device interface 135 may include a plurality of external input terminals. The plurality of external input terminals may include an RGB terminal, at least one High Definition Multimedia Interface (HDMI) terminal, and a component terminal.

An image signal of an external device inputted through the external device interface 135 may be outputted through the display 180. A sound signal of an external device inputted through the external device interface 135 may be outputted through the speaker 185.

An external device connectable to the external device interface 135 may be one of a set-top box, a Blu-ray player, a DVD player, a game console, a sound bar, a smartphone, a PC, a USB Memory, and a home theater system but this is just exemplary.

The network interface 133 may provide an interface for connecting the display device 100 to a wired/wireless network comprising internet network. The network interface 133 may transmit or receive data to or from another user or another electronic device through an accessed network or another network linked to the accessed network.

Additionally, some content data stored in the display device 100 may be transmitted to a user or an electronic device, which is selected from other users or other electronic devices pre-registered in the display device 100.

The network interface 133 may access a predetermined webpage through an accessed network or another network linked to the accessed network. In other words, the network interface 133 may transmit or receive data to or from a corresponding server by accessing a predetermined webpage through the network.

The network interface 133 may receive content or data provided from a content provider or a network operator. In other words, the network interface 133 may receive content, such as movies, advertisements, games, VODs, and broadcast signals, which are provided from the content provider or the network operator, and information relating thereto through the network.

In addition, the network interface 133 may receive firmware update information and update files provided from the network operator, and may transmit data to the Internet or content provider or the network operator.

The network interface 133 may select and receive a desired application among applications open to the air, through network.

The memory 140 may store signal-processed image, voice, or data signals stored by a program in order for each signal processing and control in the controller 170.

In addition, the memory 140 may perform a function for temporarily storing image, voice, or data signals output from the external device interface 135 or the network interface 133, and may store information on a predetermined image through a channel memory function.

The memory 140 may store an application or an application list input from the external device interface 135 or the network interface 133.

The display device 100 may play content files (e.g., video files, still image files, music files, document files, application files, etc.) stored in the memory 140, and may provide the content files to a user.

The user input interface 150 may transmit signals input by a user to the controller 170, or may transmit signals from the controller 170 to a user. For example, the user input interface 150 may receive or process control signals such as power on/off, channel selection, and screen setting from the remote control device 200 or transmit control signals from the controller 170 to the remote control device 200 according to various communication methods such as Bluetooth, Ultra Wideband (WB), ZigBee, Radio Frequency (RF), and IR communication methods.

In addition, the user input interface 150 may transmit, to the controller 170, control signals input from local keys (not illustrated) such as a power key, a channel key, a volume key, and a setting key.

Image signals that are image-processed by the controller 170 may be input to the display 180 and displayed as images corresponding to the image signals. In addition, image signals that are image-processed by the controller 170 may be input to an external output device through the external device interface 135.

Voice signals processed by the controller 170 may be output to the speaker 185. In addition, voice signals processed by the controller 170 may be input to the external output device through the external device interface 135.

Additionally, the controller 170 may control overall operations of the display device 100.

In addition, the controller 170 may control the display device 100 by a user command or an internal program input through the user input interface 150, and may access the network to download a desired application or application list into the display device 100.

The controller 170 may output channel information selected by a user together with the processed image or voice signals through the display 180 or the speaker 185.

In addition, the controller 170 may output image signals or voice signals of an external device such as a camera or a camcorder, which are input through the external device interface 135, through the display 180 or the speaker 185, according to an external device image playback command received through the user input interface 150.

Moreover, the controller 170 may control the display 180 to display images, and may control the display 180 to display broadcast images input through the tuner 131, external input images input through the external device interface 135, images input through the network interface unit, or images stored in the memory 140. In this case, an image displayed on the display 180 may be a still image or video and also may be a 2D image or a 3D image.

Additionally, the controller 170 may play content stored in the display device 100, received broadcast content, and external input content input from the outside, and the content may be in various formats such as broadcast images, external input images, audio files, still images, accessed web screens, and document files.

Moreover, the wireless communication interface 173 may perform wired or wireless communication with an external device. The wireless communication interface 173 may perform short-range communication with an external device. For this, the wireless communication interface 173 may support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication interface 173 may detect (or recognize) a wearable device capable of communication around the display device 100.

Furthermore, if the detected wearable device is a device authenticated to communicate with the display device 100, the controller 170 may transmit at least part of data processed in the display device 100 to the wearable device through the wireless communication interface 173. Therefore, a user of the wearable device may use the data processed by the display device 100 through the wearable device.

The display 180 may convert image signals, data signals, or on-screen display (OSD) signals, which are processed in the controller 170, or images signals or data signals, which are received in the external device interface 135, into R, G, and B signals to generate driving signals.

Furthermore, the display device 100 illustrated in FIG. 1 is just one embodiment of the present disclosure and thus, some of the components illustrated may be integrated, added, or omitted according to the specification of the actually implemented display device 100.

In other words, if necessary, two or more components may be integrated into one component, or one component may be divided into two or more components. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface 133 or the external device interface 135 and play them without including the tuner 131 and the demodulator 132.

For example, the display device 100 may be divided into an image processing device such as a set-top box for receiving broadcast signals or contents according to various network services and a content playback device for playing content input from the image processing device.

In this case, an operating method of a display device according to an embodiment of the present disclosure described below may be performed by one of the display device described with reference to FIG. 1, an image processing device such as the separated set-top box, and a content playback device including the display 180 and the speaker 185.

A remote control device according to an embodiment of the present disclosure will be described with reference to FIGS. 2 and 3.

Figure 2:
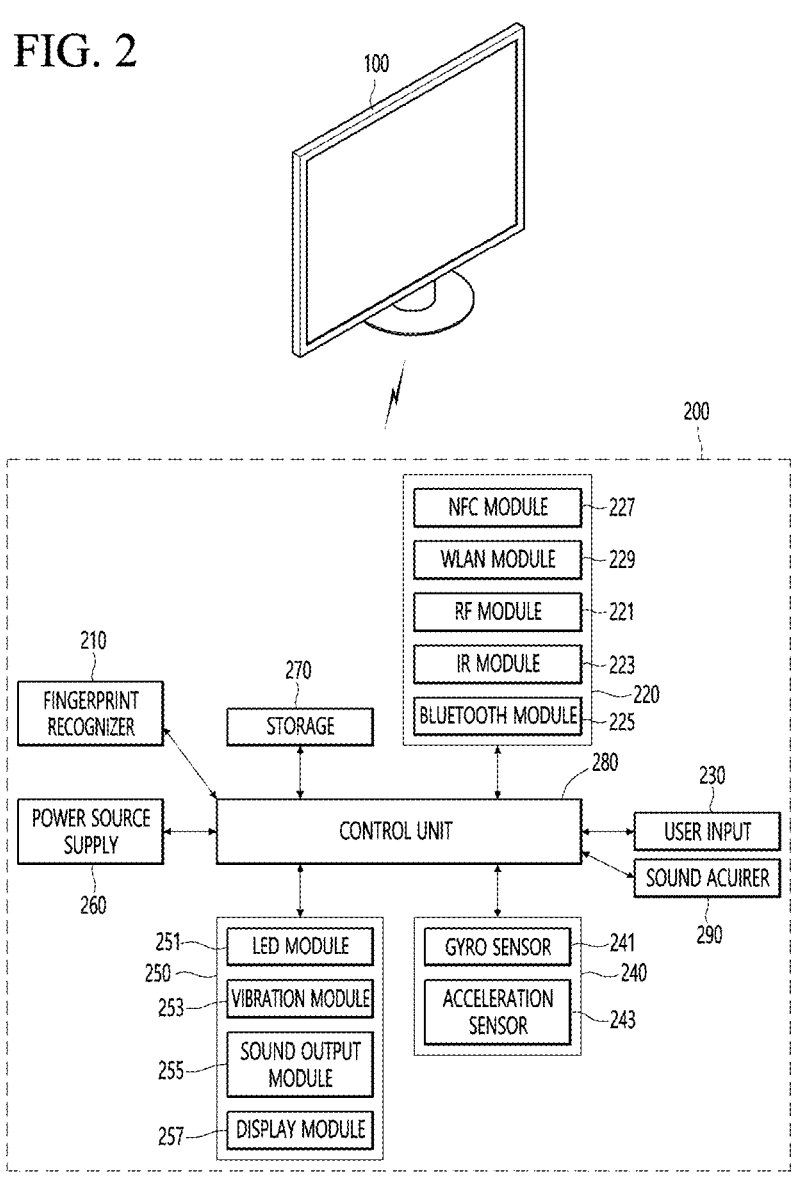
FIG. 2 is a block diagram illustrating a remote control device according to an embodiment of the present disclosure.
Figure 3:
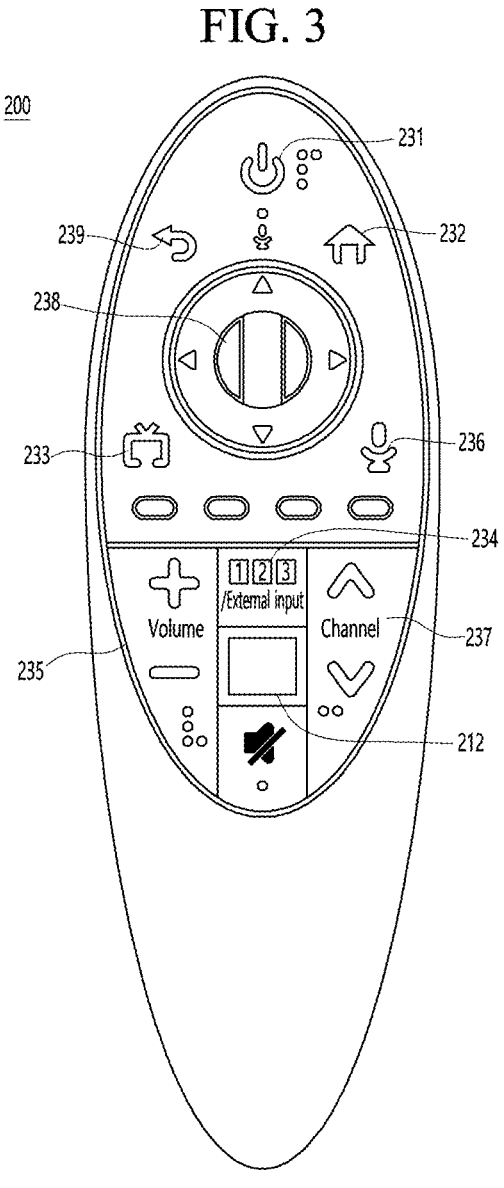
FIG. 3 is a view illustrating an actual configuration of a remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 transmits/receives signals to/from an arbitrary any one of display devices according to the above-mentioned embodiments of the present disclosure.

The remote control device 200 may include a radio frequency (RF) circuit 221 capable of transmitting or receiving signals to or from the display device 100 according to an RF communication standard, and an IR circuit 223 capable of transmitting or receiving signals to or from the display device 100 according to an IR communication standard. In addition, the remote control device 200 may include a Bluetooth circuit 225 capable of transmitting or receiving signals to or from the display device 100 according to a Bluetooth communication standard. In addition, the remote control device 200 may include an NFC circuit 227 capable of transmitting or receiving signals to or from the display device 100 according to an NFC communication standard, and a wireless LAN (WLAN) circuit 229 capable of transmitting or receiving signals to or from the display device 100 according to a WLAN communication standard.

In addition, the remote control device 200 may transmit signals containing information on the movement of the remote control device 200 to the display device 100 through the wireless communication circuit 220.

Moreover, the remote control device 200 may receive signals transmitted from the display device 100 through the RF circuit 221 and if necessary, may transmit a command for power on/off, channel change, and volume change to the display device 100 through the IR circuit 223.

The user input interface 230 may be configured with a keypad, a button, a touch pad, or a touch screen. A user may operate the user input interface 230 to input a command relating to the display device 100 to the remote control device 200. If the user input interface 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation.

The power button 231 may be a button for turning on/off the power of the display device 100.

The home button 232 may be a button for moving to the home screen of the display device 100.

The live button 233 may be a button for displaying live broadcast programs.

The external input button 234 may be a button for receiving an external input connected to the display device 100.

The volume control button 235 may be a button for controlling a volume output from the display device 100.

The voice recognition button 236 may be a button for receiving user's voice and recognizing the received voice.

The channel change button 237 may be a button for receiving broadcast signals of a specific broadcast channel.

The OK button 238 may be a button for selecting a specific function, and the back button 239 may be a button for returning to a previous screen.

FIG. 2 is described again.

If the user input interface 230 includes a touch screen, a user may touch a soft key of the touch screen to input a command relating to the display device 100 to the remote control device 200. In addition, the user input interface 230 may include various kinds of input interfaces operable by a user, for example, a scroll key and a jog key, and this embodiment does not limit the scope of the present disclosure.

The sensor 240 may include a gyro sensor 241 or an acceleration sensor 243. The gyro sensor 241 may sense information on the movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor that senses a distance with respect to the display 180 of the display device 100.

The output interface 250 may output image or voice signals in response to the operation of the user input interface 230, or may output image or voice signals corresponding to signals transmitted from the display device 100.

A user may recognize whether the user input interface 230 is operated or the display device 100 is controlled through the output interface 250.

For example, the output interface 250 may include an LED 251 for flashing, a vibrator 253 for generating vibration, a speaker 255 for outputting sound, or a display 257 for outputting an image, if the user input interface 230 is manipulated or signals are transmitted/received to/from the display device 100 through the wireless communication circuit 220.

Additionally, the power supply circuit 260 supplies power to the remote control device 200 and if the remote control device 200 does not move for a predetermined time, stops the power supply, so that power waste may be reduced.

The power supply circuit 260 may resume the supply of power if a predetermined key provided at the remote control device 200 is operated.

The memory 270 may store various kinds of programs and application data required to control or operate the remote control device 200.

If the remote control device 200 transmits/receives signals wirelessly through the display device 100 and the RF circuit 221, the remote control device 200 and the display device 100 transmits/receives signals through a predetermined frequency band.

The controller 280 of the remote control device 200 may store, in the memory 270, information on a frequency band for transmitting/receiving signals to/from the display device 100 paired with the remote control device 200 and refer to it.

The controller 280 controls general matters relating to the control of the remote control device 200. The controller 280 may transmit a signal corresponding to a predetermined key operation of the user input interface 230 or a signal corresponding to the movement of the remote control device 200 sensed by the sensor 240 to the display device 100 through the wireless communication circuit 220.

In addition, the microphone 290 of the remote control device 200 may acquire voice.

A plurality of microphone 290 may be provided.

Figure 4:
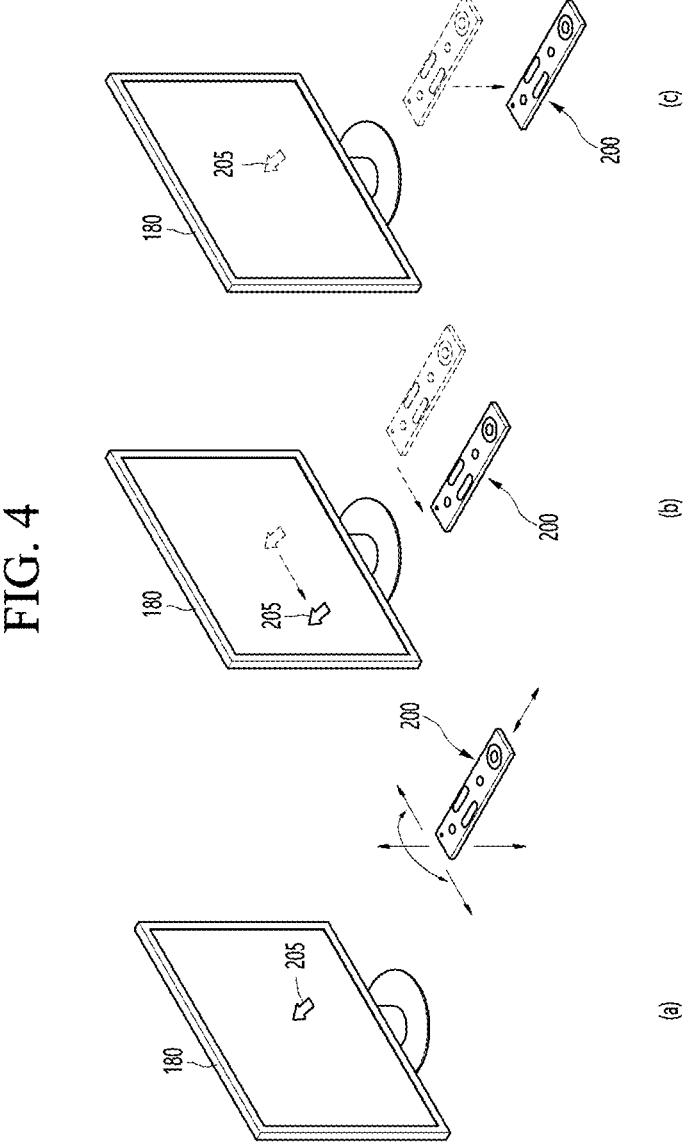
FIG. 4 is a view illustrating an example of utilizing a remote control device according to an embodiment of the present disclosure.

Next, FIG. 4 is described.

FIG. 4 is a view illustrating an example of utilizing a remote control device according to an embodiment of the present disclosure.

FIG. 4(*a*) illustrates that a pointer 205 corresponding to the remote control device 200 is displayed on the display 180.

A user may move or rotate the remote control device 200 vertically or horizontally. The pointer 205 displayed on the display 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(*b*) illustrates that if a user moves the remote control device 200, the pointer 205 displayed on the display 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(*c*) illustrates that while a specific button in the remote control device 200 is pressed, a user moves the remote control device 200 away from the display 180. Thus, a selected region in the display 180 corresponding to the pointer 205 may be zoomed in and displayed in an enlarged size.

On the other hand, if a user moves the remote control device 200 close to the display 180, a selected region in the display 180 corresponding to the pointer 205 may be zoomed out and displayed in a reduced size.

On the other hand, if the remote control device 200 is moved away from the display 180, a selected region may be zoomed out and if the remote control device 200 is moved closer to the display 180, a selected region may be zoomed in.

Additionally, if a specific button in the remote control device 200 is pressed, recognition of a vertical or horizontal movement may be excluded. In other words, if the remote control device 200 is moved away from or closer to the display 180, the up, down, left, or right movement maynot be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display 180 and also may be displayed in correspondence to a plurality of points such as a line and a surface.

Figure 5:
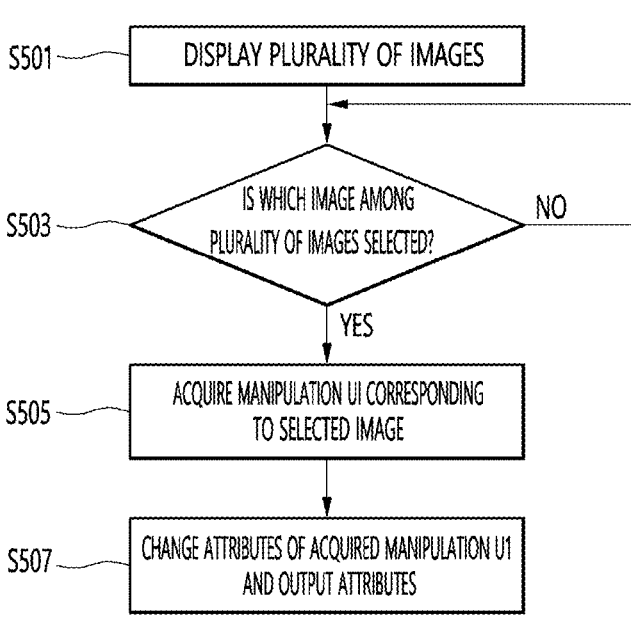
FIG. 5 is a view explaining a method for operating a display device according to an embodiment of the present disclosure.

FIG. 5 is a view explaining a method for operating a display device according to an embodiment of the present disclosure.

Referring to FIG. 5, the controller 170 of the display device 100 displays a plurality of images on the display 180 (S501).

In one embodiment, the controller 170 may display a plurality of images in each of a plurality of regions.

Each of the plurality of regions may be distinguished from each other.

Each of the plurality of images may be any one of a broadcast image received through a tuner 131, a content image received through a network interface 133, an external device image received from an external device through an external device interface 135, and a wireless image received through a wireless communication interface 173.

The broadcast image received through the tuner 131 may be a real-time broadcast image.

The content image received through the network interface 133 may be an image received from a content provider server. The network interface 133 may perform Internet Protocol (IP) communication with the content provider server.

The controller 170 may receive an image signal from an external device through an external device interface 135 and display an external device image based on the received image signal on the display 180.

The controller 170 may receive a mirrored image from a mobile terminal through a screen sharing service function (or screen mirroring function) and display the received mirrored image on the display 180.

The controller 170 may receive a mirrored image from a mobile terminal through a wireless communication standard such as a Bluetooth or Wi-Fi standard.

Again, FIG. 5 is explained.

The controller 170 determines which image among a plurality of images has been selected (S503).

In one embodiment, when the controller 170 receives an image selection command from the remote control device 200, it may determine that the image has been selected.

In another embodiment, the controller 170 may determine that an image is selected if a highlight box for image selection is positioned on a specific image for a certain period of time.

In another embodiment, the controller 170 may determine that a specific image is selected when a cursor or pointer that moves in accordance with the movement of the remote control device 200 is positioned over a region where a specific image is displayed.

When one of the plurality of images is selected, the controller 170 acquires a manipulation user interface (UI) corresponding to the selected image (S505).

The controller 170 may receive image data corresponding to the image and manipulation UI data corresponding to the manipulation UI from an image source providing the selected image.

The image source may be any one of a broadcasting station transmitting broadcast image through a tuner 131, a content provider server transmitting content image through a network interface 133, an external device transmitting image through an external device interface 135, and a mobile terminal transmitting mirrored image through a wireless communication interface 173.

The mobile terminal may be a device such as a smartphone or a smart pad.

The controller 170 may acquire the manipulation UI data by separating only the manipulation UI data from the entire data including the image data and manipulation UI data from the image source.

The controller 170 may separate image data and manipulation UI data from the entire data and extract manipulation UI data based on the separated results.

For example, the controller 170 may receive data including a content image and a manipulation UI for controlling playback of the content image from a content provider server. The controller 170 may extract the manipulation UI from the received data. The received data may include identification data that identifies it as the manipulation UI.

The controller 170 may identify the manipulation UI from the entire data received using the identification data and extract the manipulation UI.

In another embodiment, the controller 170 may generate its own manipulation UI based on the image source.

The controller 170 may determine the type of the image source and acquire a manipulation UI matching the type of the determined image source.

The type of image source may be any one of a broadcasting station transmitting broadcast image through a tuner 131, a content provider server transmitting content image through a network interface 133, an external device transmitting image through an external device interface 135, and a mobile terminal transmitting mirrored image through a wireless communication interface 173.

The controller 170 may determine the type of the image source that transmitted the image and generate a manipulation UI that matches the type of the determined image source.

The memory 140 may store a plurality of manipulation UIs that match each of a plurality of image source types.

When the image source type is determined, the controller 170 may extract a manipulation UI matching the determined video source type from the memory 140.

In other words, the controller 170 may display different types of manipulation UI according to the type of image source.

If the image source is a broadcasting station, the form of the manipulation UI may be a UI for changing channels.

If the image source is a content provider that provides a video streaming service, the manipulation UI may be a UI for controlling video playback.

If the image source is a mobile terminal providing a mirroring service, the manipulation UI may be a UI for manipulating the mirrored image.

The controller 170 changes the attributes of the acquired manipulation UI and outputs them through the display 180 (S507).

The attributes of the manipulation UI may include one or more of the size of the manipulation UI, the display position, and the arrangement of a plurality of manipulation buttons included in the manipulation UI.

The controller 170 may enlarge the size of the manipulation UI and display it on the display 180.

The controller 170 may display the manipulation UI in a location other than the region where the selected image is displayed.

The controller 170 may enlarge the size of the manipulation UI and adjust the display position of the manipulation UI.

Meanwhile, the manipulation UI may be displayed semi-transparently so as not to obstruct the viewing of the image displayed where the manipulation UI is located.

A user may perform a desired manipulation on an image by selecting a plurality of manipulation buttons included in the manipulation UI. A remote control device 200 may be used to select the manipulation buttons.

The display device 100 may receive a manipulation command for selecting a manipulation button included in the manipulation UI from the remote control device 200 and perform an operation according to the received manipulation command.

Accordingly, individual control may be performed only for selected images among a plurality of images.

Figure 6:
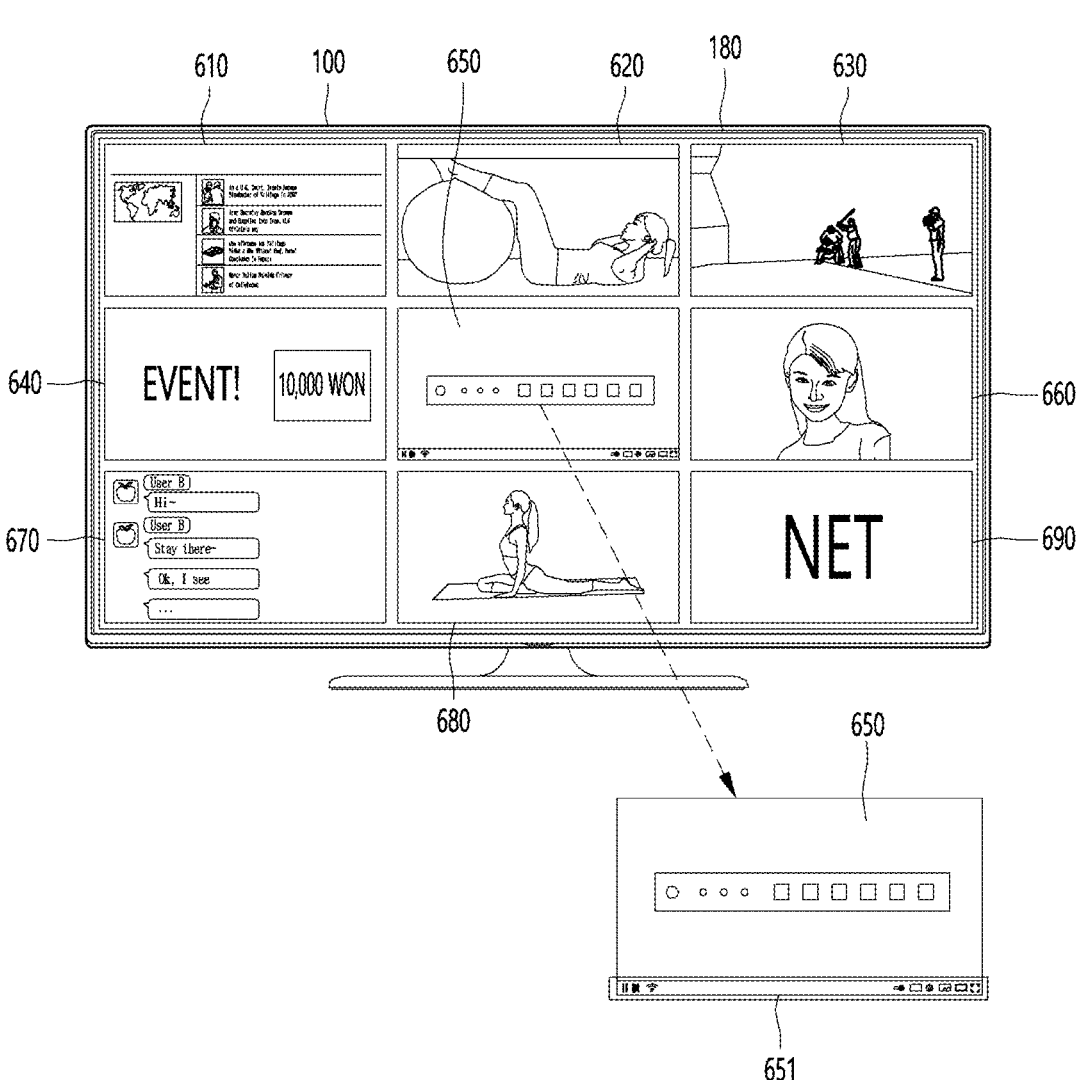
FIG. 6 is a view explaining an example of displaying a plurality of images according to the prior art.
Figure 7:
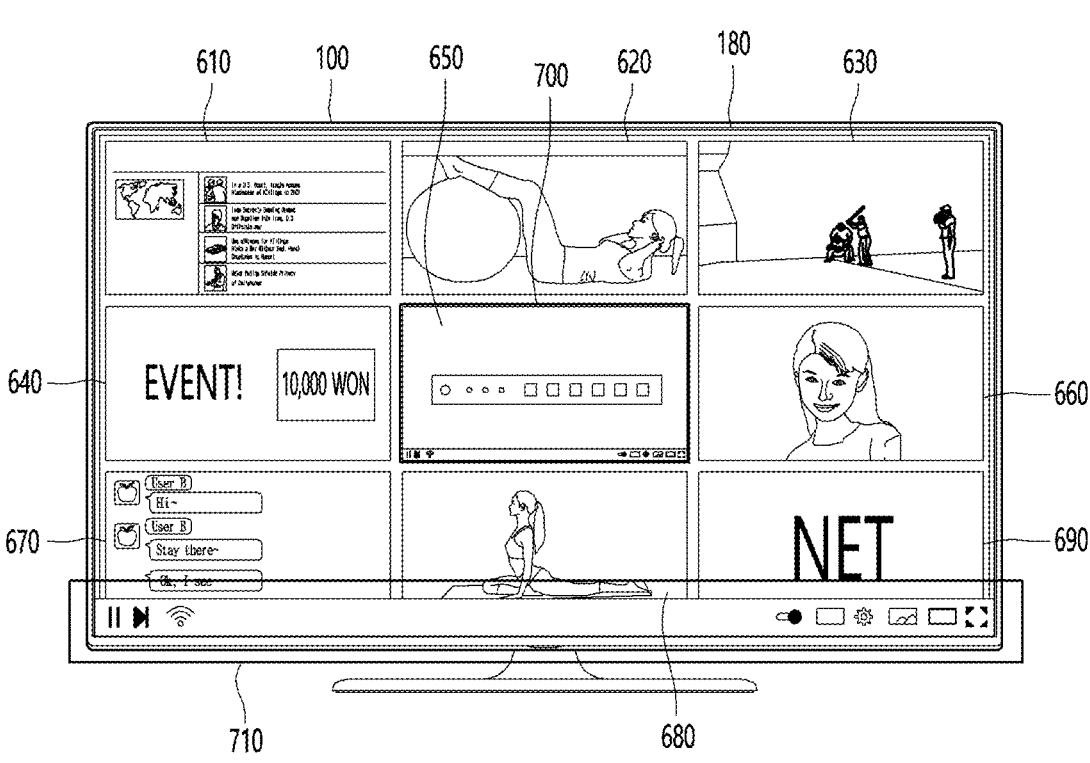

FIG. 6 is a view explaining an example of displaying a plurality of images according to the prior art.

Referring to FIG. 6, the display device 100 may display a plurality of images 610 to 690 on the display 180 in each of a plurality of regions.

In other words, FIG. 6 illustrates a screen in which the multi-view function of the display device 100 is in operation.

When one 650 of the plurality of images 610 to 690 is selected, the display device 100 may display a manipulation UI 651 for manipulation of the image 650 on the region where the selected image 650 is displayed.

As the number of images displayed on a display device supporting a multi-view function increases, the size of one image may decrease. Accordingly, the size of the manipulation UI 651 for manipulating the image 650 may also decrease, and the user may feel inconvenienced in manipulating the image 650.

Accordingly, according to an embodiment of the present disclosure, when the multi-view function is performed, at least one of the size or position of the manipulation UI may be adjusted for the convenience of the user's manipulation.

FIGS. 7 to 10 are views illustrating examples in which attributes of a manipulation UI are changed according to an embodiment of the present disclosure.

Referring to FIGS. 7 to 10, the display device 100 may display a plurality of images 610 to 690 on the display 180.

In FIGS. 7 to 10, it is assumed that nine images are displayed according to the multi-view function, but the number of images is only an example.

A user may select a specific image 650 from among a plurality of images 610 to 690 via a remote control device 200.

The user may manipulate the position of the highlight box 700 and select an image 650 using the direction keys of the remote control device 200.

The display device 100 may determine that the image 650 is selected when a highlight box 700 is positioned on the image 650 and a selection command for selecting the image 650 is received from the remote control device 200.

The display device 100 may acquire UI data for a manipulation UI matching a selected image 650 and change attributes of the manipulation UI based on the acquired UI data.

Attributes may include one or more of the size or position of the manipulation UI.

The display device 100 may change the size and position of the manipulation UI to display the manipulation UI 710 with changed attributes on the display 180.

In other words, the display device 100 may enlarge the manipulation UI 651 (see FIG. 6) displayed within the region where the image (650) is displayed, and change the location to the lower end of the entire region to display the manipulation UI 710 with changed attributes on the display 180.

In other words, the size of the changed manipulation UI 710 is larger than that of the existing manipulation UI 651, and the location is also moved over the entire region. Accordingly, the user may conveniently manipulate the playback of the selected image 650 through the changed manipulation UI 710.

Figure 8:
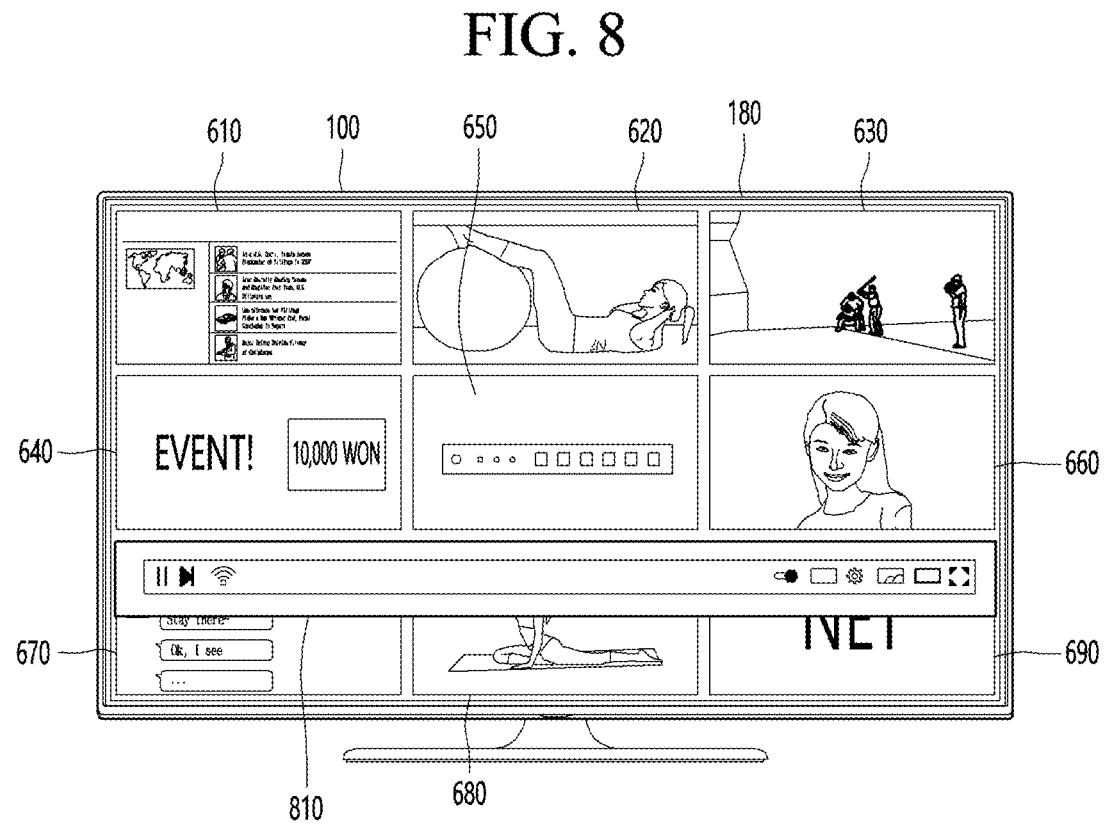

In another embodiment, the display device 100 may place the location of the manipulation UI 810 whose attributes have been changed at the lower end adjacent to the selected image 650, as illustrated in FIG. 8.

Figure 9:
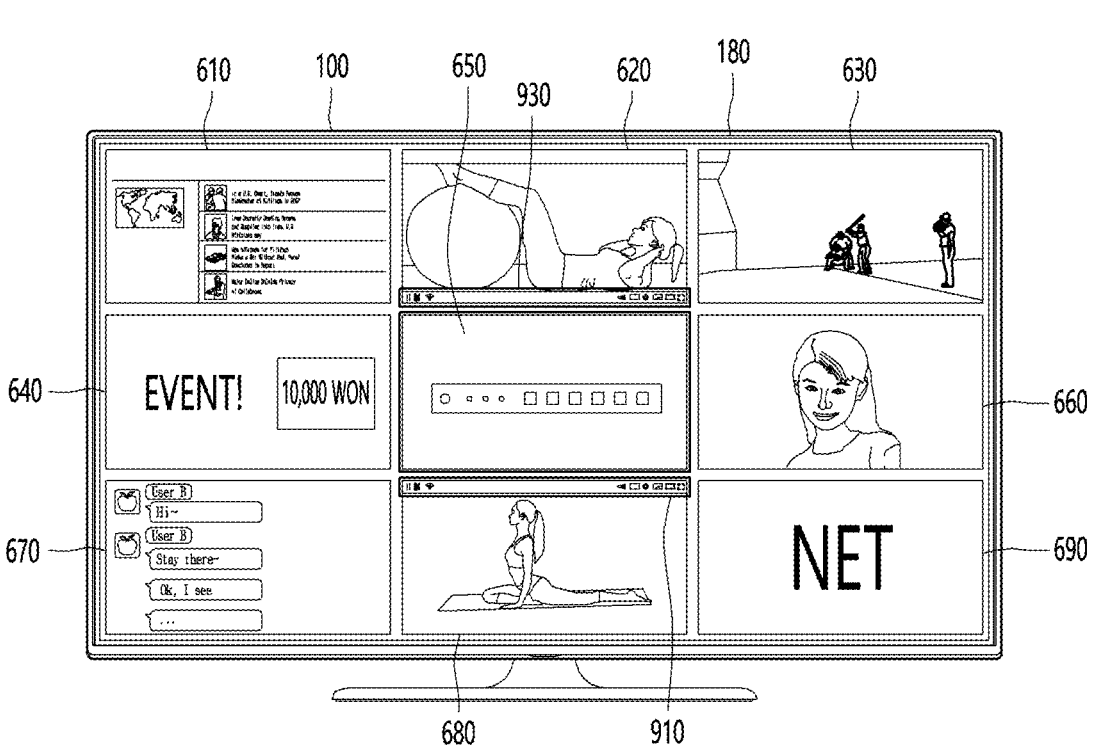

In another embodiment, the display device 100 may place a first sub-manipulation UI 910 including some of the manipulation buttons among the plurality of manipulation buttons included in the existing manipulation UI 651 and a second sub-manipulation UI 930 including the remaining manipulation buttons adjacent to the selected image 650, as illustrated in FIG. 9.

For example, the first sub-manipulation UI 910 may be placed at the lower end of the selected image 650, and the second sub-manipulation UI 930 may be placed at the upper end of the selected image 650.

As another example, the first sub-manipulation UI 910 may be placed on the left side of the selected image 650, and the second sub-manipulation UI 930 may be placed on the right side of the selected image 650.

Figure 10:
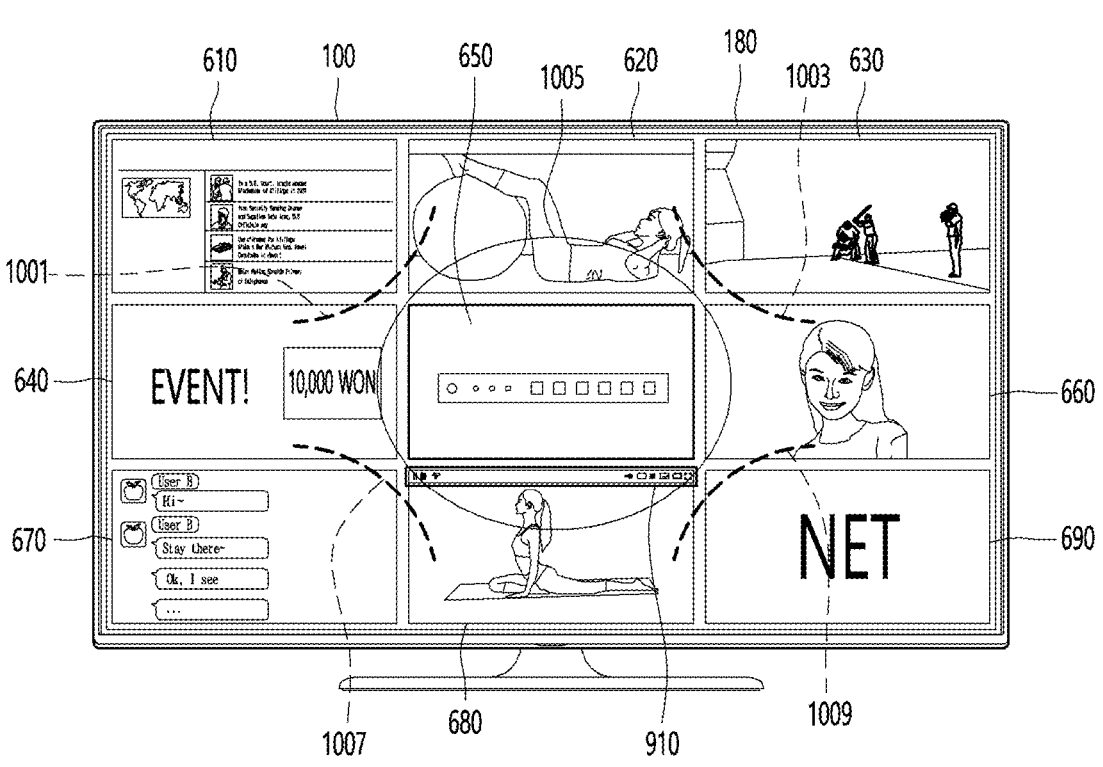

FIG. 10 is a view explaining that a region where a manipulation UI may be displayed may be divided according to the location of the selected image.

Referring to FIG. 10, the manipulation UI may vary according to the location where the image is displayed.

For example, the manipulation UI for manipulating the first image 610 may be displayed in a region other than the region where the first image 610 is displayed within the first boundary line 1001.

Similarly, the manipulation UI for manipulating the third image 630 may be displayed in a region other than the region where the third image 630 is displayed within the second boundary line 1003.

The manipulation UI for manipulating the seventh image 670 may be displayed in a region other than the region where the seventh image 670 is displayed within the third boundary line 1007.

The manipulation UI for manipulating the ninth image 690 may be displayed in a region other than the region where the ninth image 690 is displayed within the fourth boundary line 1009.

The manipulation UI for manipulating the fifth image 650 may be displayed in a region other than the region where the fifth image 650 is displayed within the fifth boundary line 1005.

Figure 11:
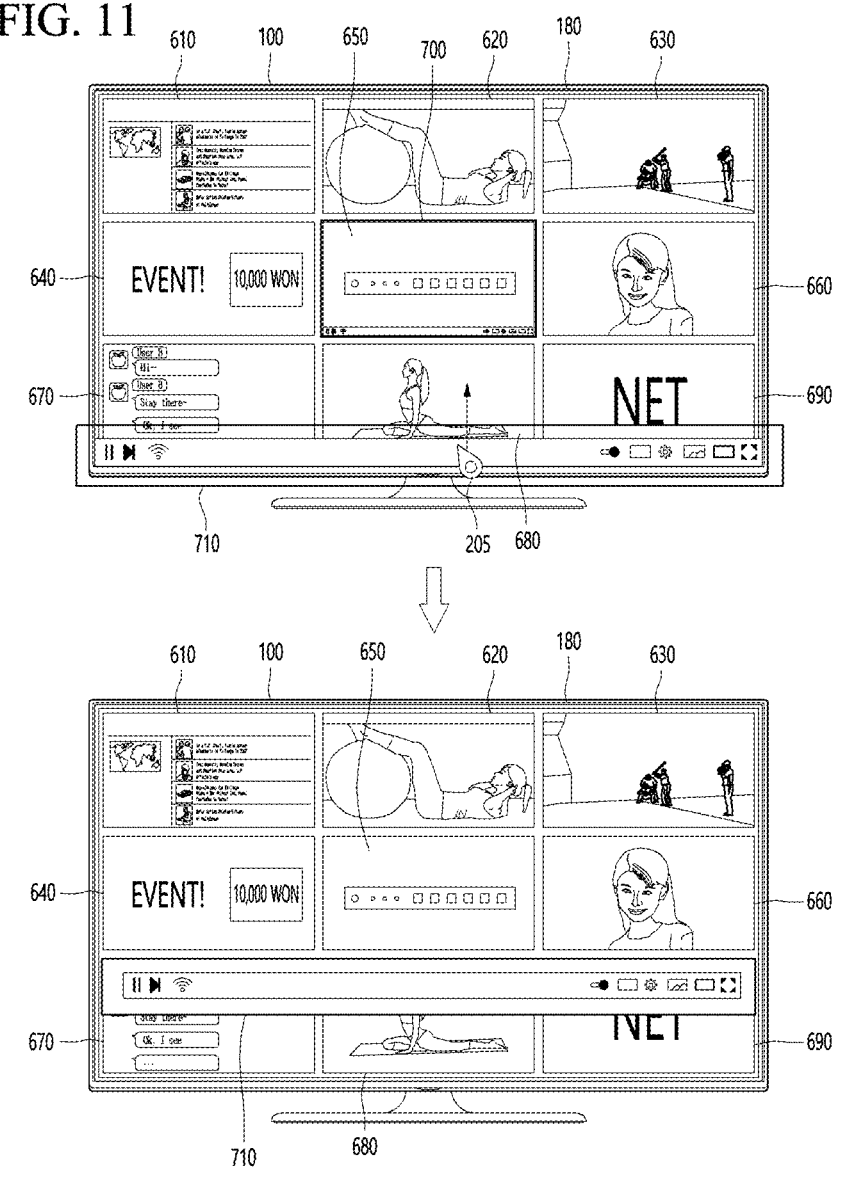
FIG. 11 is a view illustrating an example in which the position of a manipulation UI may be changed according to user input according to an embodiment of the present disclosure.

FIG. 11 is a view illustrating an example in which the position of a manipulation UI may be changed according to user input according to an embodiment of the present disclosure.

Referring to FIG. 11, a changed manipulation UI 710 corresponding to a selected image 650 is displayed on the entire region of the display 180.

The display device 100 may display a pointer 205 controlled according to the movement of the remote control device 200.

When the display device 100 selects the manipulation UI 710 through the pointer 205 and receives a drag-and-drop command to position the selected manipulation UI 710 at the lower end of the image 650, the position of the manipulation UI 710 may be moved from the lowest end of the entire region to the lower end of the selected image 650.

In this way, according to an embodiment of the present disclosure, the user may move the position of the manipulation UI to a desired location, thereby improving the convenience of operation.

Figure 12:
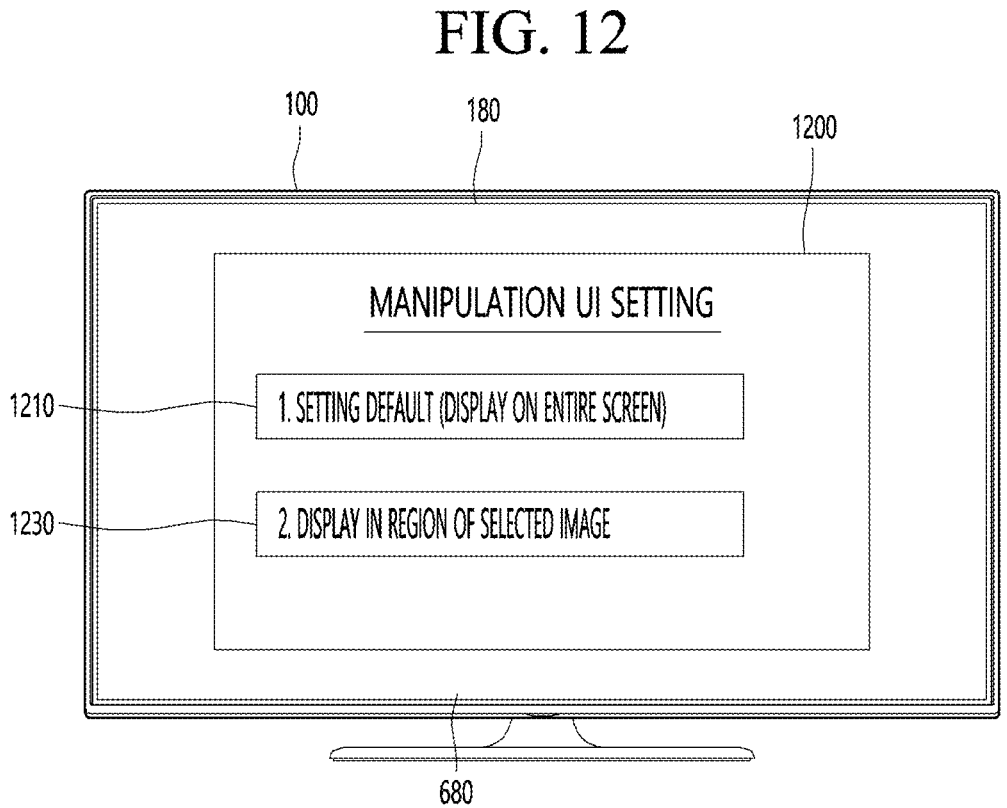
FIG. 12 is a view explaining a method for setting a manipulation UI according to an embodiment of the present disclosure.

FIG. 12 is a view explaining a method for setting a manipulation UI according to an embodiment of the present disclosure.

The display mode of the manipulation UI may include a default setting mode (or full screen setting mode) and a selected region setting mode.

The default setting mode (or full screen setting mode) may be a mode in which the manipulation UI corresponding to the image selected during the execution of the multi-view function is displayed on the full screen.

The selected region setting mode may be a mode in which a manipulation UI corresponding to the selected image is displayed within the region of the selected image while performing the multi-view function.

Referring to FIG. 12, the display device 100 may display a manipulation UI setting menu 1200 on the display 180 upon receiving a menu manipulation command.

The manipulation UI setting menu 1200 may include a default setting item 1210 for activating the default setting mode and a selected region setting item 1230 for activating the selected region setting mode.

The user may set the display position of the manipulation UI by selecting either the default setting item 1210 or the selected region setting item 1230.

Figure 13:
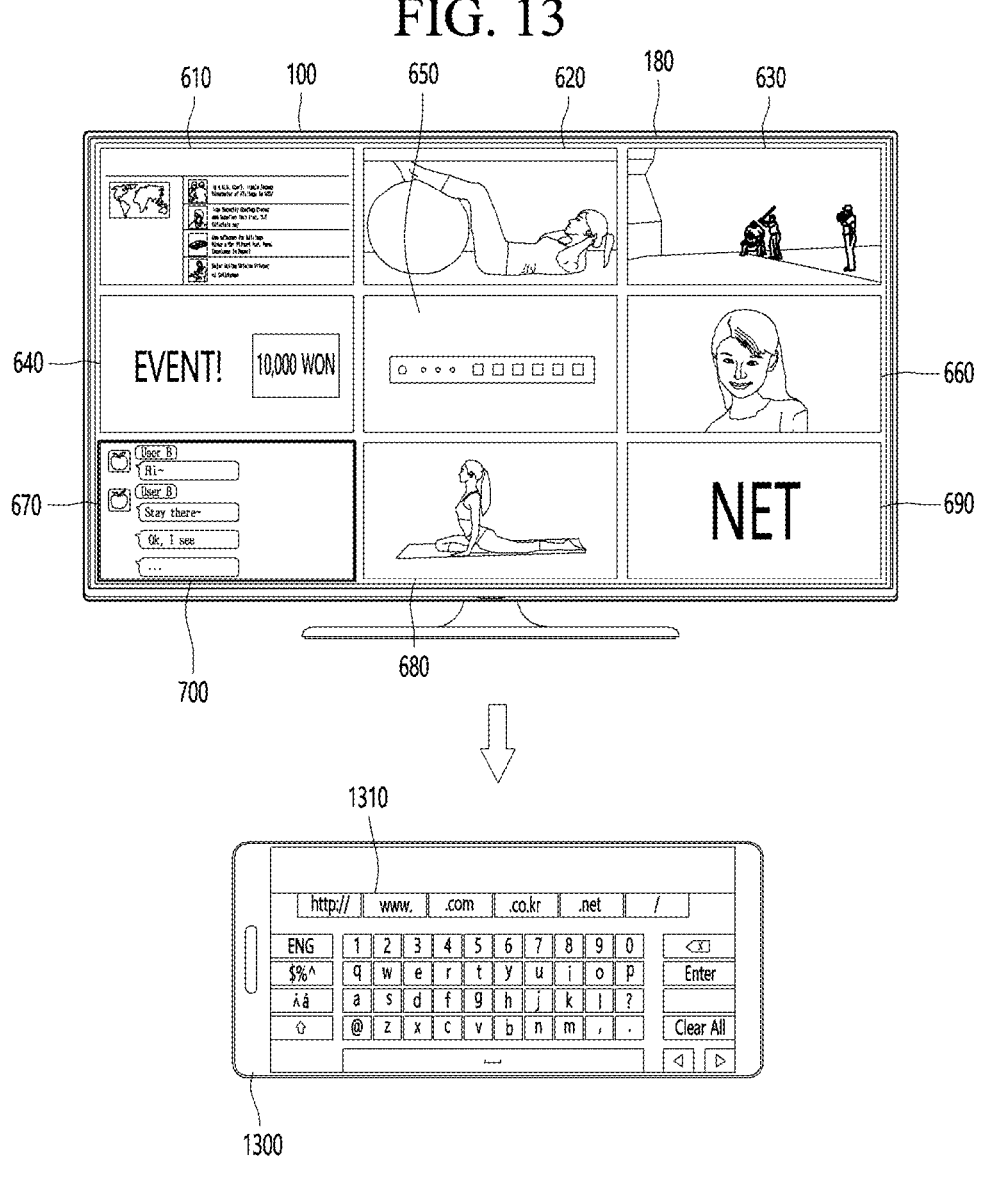
FIG. 13 is a view illustrating an example of transmitting data for a manipulation UI according to an image type and an application based on the image to a mobile terminal according to an embodiment of the present disclosure.

FIG. 13 is a view illustrating an example of transmitting data for a manipulation UI according to an image type and an application based on the image to a mobile terminal according to an embodiment of the present disclosure.

The display device 100 may display the first to ninth images 610 to 690 on the display 180 through the multi-view function.

The seventh image 670 may be a mirrored image received from a mobile terminal 1300 through a screen mirroring function of the mobile terminal 1300. The mirrored image may be an execution image of a chat application.

When the display device 100 determines that the seventh image 670 is selected, it may acquire a manipulation UI matching the seventh image 670 and transmit UI data for the acquired manipulation UI to the mobile terminal 1300. Here, the manipulation UI may be a virtual keyboard window.

The display device 100 may receive information about a mirrored image and an application of the mirrored image (including application identification information) from a mobile terminal 1300.

The display device 100 may identify the application that is the basis of the seventh image 670 based on the application identification information, and transmit UI data for a virtual keyboard window matching the identified application to the mobile terminal 1300.

The mobile terminal 1300 may display a virtual keyboard window 1310 based on UI data received from the display device 100.

When a virtual keyboard window 1310 is displayed on the display 180 of the display device 100, it is inconvenient for the user to input text one by one through the remote control device 200.

When UI data for a virtual keyboard window is transmitted to a mobile terminal 1300 according to the embodiment of FIG. 13, a user may easily input text through the virtual keyboard window 1310.

According to an embodiment of the present disclosure, the above-described method may be implemented as processor-readable code on a program-recorded medium. Examples of media that the processor may read include ROM, RAM, CD-ROM, magnetic tape, floppy disk, and optical data storage devices.

The display device described above is not limited to the configuration and method of the above-described embodiments, and the embodiments may be configured by selectively combining all or part of each embodiment so that various modifications may be made.

The invention claimed is:

1. A display device comprising:
   a display configured to display a plurality of images in each of a plurality of regions;
   a controller configured to:
   receive a selection command for selecting one of the plurality of images,
   acquire a manipulation user interface (UI) for manipulating the selected image according to the received selection command,
   change attributes of the acquired manipulation UI, and
   display the manipulation UI with the changed attributes on the display;
   a network interface for receiving content images from a content provider;
   an external device interface for receiving external device images from an external device; and
   a wireless communication interface for receiving mirrored images from a mobile terminal through a screen mirroring function,
   wherein the controller receives the entire data including the image data of the selected image and UI data corresponding to the manipulation UI from an image source, and separates the UI data from the received entire data to acquire the manipulation UI, and
   wherein the image source is one of the broadcasting station, the content provider, the external device, or the mobile terminal.

2. The display device of claim 1, wherein the attribute includes at least one of a size of the manipulation UI, a display position, or an arrangement of a plurality of manipulation buttons included in the manipulation UI.

3. The display device of claim 2, wherein the controller enlarges the manipulation UI and displays the manipulation UI on an entire region of the display.

4. The display device of claim 2, wherein the controller displays the manipulation UI adjacent to the region of the selected image.

5. The display device of claim 2, wherein the controller displays some of the manipulation buttons of the plurality of manipulation buttons included in the manipulation UI on one side of the region where the selected image is displayed, and displays the remaining manipulation buttons on one side of the region where the selected image is displayed.

6. The display device of claim 1, wherein the controller receives a command for changing the display position of the manipulation UI from a remote control device and moves the manipulation UI according to the received command.

7. The display device of claim 1, further comprising:

a memory configured to store a plurality of manipulation UIs corresponding to each of a plurality of image sources, wherein each image source is one of the broadcasting station, the content provider, the external device, or the mobile terminal, and wherein the controller determines the type of the image source and acquires a manipulation UI corresponding to the determined type from the memory.

8. The display device of claim 1, wherein the controller transmits manipulation UI data for manipulating the mirrored image to the mobile terminal when the selected image is the mirrored image.

9. The display device of claim 1, wherein the controller displays a manipulation UI setting menu for setting a display mode of the manipulation UI, and wherein the display mode of the manipulation UI includes a default setting mode for displaying the manipulation UI on the entire screen of the display, and a selected region setting mode for displaying the manipulation UI within a region of the selected image.

10. A method for operating a display device, the method comprising:

displaying a plurality of images in each of a plurality of regions;

receiving a selection command for selecting one of the plurality of images;

acquiring a manipulation user interface (UI) for manipulating the image selected according to the received selection command;

changing an attribute of the acquired manipulation UI;

displaying the manipulation UI whose attribute has been changed;

receiving, via a network interface, content images from a content provider;

receiving, via an external device interface, external device images from an external device; and receiving, via a wireless communication interface, mirrored images from a mobile terminal through a screen mirroring function; and receiving the entire data including the image data of the selected image and UI data corresponding to the manipulation UI from an image source, and separating the UI data from the received entire data to acquire the manipulation UI, wherein the image source is one of the broadcasting station, the content provider, the external device, or the mobile terminal.

11. The method of claim 10, wherein the attribute includes at least one of a size of the manipulation UI, a display position, or an arrangement of a plurality of manipulation buttons included in the manipulation UI.

12. The method of claim 11, wherein the displaying the manipulation UI includes enlarging the manipulation UI and displaying the manipulation UI over the entire region of the display.

13. The method of claim 11, wherein the displaying the manipulation UI includes displaying the manipulation UI adjacent to the region of the selected image.

* * * * *